US012811404B2

(12) United States Patent
Mathias et al.

(10) Patent No.: US 12,811,404 B2
(45) Date of Patent: Nov. 24, 2026

(54) POWER MANAGING METHOD AND SYSTEM

(71) Applicant: TOTALENERGIES RENEWABLES, Courbevoie (FR)

(72) Inventors: Laurent Mathias, La Tour de Salvagny (FR); Clément Guyon, Paris (FR)

(73) Assignee: TOTALENERGIES RENEWABLES, Courbevoie (FR)

( * ) Notice: Subject to any disclaimer, the term of this patent is extended or adjusted under 35 U.S.C. 154(b) by 773 days.

(21) Appl. No.: 18/255,685

(22) PCT Filed: Dec. 3, 2021

(86) PCT No.: PCT/EP2021/084127
§ 371 (c)(1),
(2) Date: Jun. 2, 2023

(87) PCT Pub. No.: WO2022/117794
PCT Pub. Date: Jun. 9, 2022

(65) Prior Publication Data

US 2024/0030712 A1 Jan. 25, 2024

(30) Foreign Application Priority Data

Dec. 4, 2020 (EP) .................................... 20315483

(51) Int. Cl.
*H02J 7/00* (2026.01)
*H02J 3/32* (2006.01)
(Continued)

(52) U.S. Cl.
CPC ................ *H02J 3/32* (2013.01); *H02J 7/585* (2026.01); *H02J 7/82* (2026.01)

(58) Field of Classification Search
CPC ................. H02J 3/32; H02J 7/82; H02J 7/585
(Continued)

(56) References Cited

U.S. PATENT DOCUMENTS 9,252,620 B2 2/2016 Yamauchi et al.
2012/0176095 A1* 7/2012 Okuda ...................... H02J 7/50 320/134
(Continued)

FOREIGN PATENT DOCUMENTS

WO 2012165300 A1 12/2012

OTHER PUBLICATIONS

Japanese Office Action cited in Japanese Application No. 2023-534381 dated Nov. 4, 2025, with English translation, 9 pages.
(Continued)

*Primary Examiner* — Alexis B Pacheco
(74) *Attorney, Agent, or Firm* — Dilworth IP, LLC

(57) ABSTRACT

The invention relates to a power managing method of an energy storage system (1) coupled to a power grid, the energy storage system (1) including a predetermined number of energy storage devices (A-K) and power conversion systems (PCS1, PCSn) respectively coupled to at least one associated energy storage device (A-K). The method comprises: —sequencing the energy storage devices (A-K) on the basis of their respective state of charge, —determining a request to absorb or to provide electrical power, —setting at least one electrical power threshold to be absorbed or provided per energy storage device, —depending on the electrical power requested and said electrical power threshold set, calculating a number of energy storage devices to be activated, —activating the calculated number of energy storage devices and their associated power conversion systems (PCS1, PCSn), according to the sequence ranking. The invention also relates to a system for implementing said method.

13 Claims, 3 Drawing Sheets

(51) Int. Cl.
*H02J 7/14* (2006.01)
*H02J 7/50* (2026.01)
*H02J 7/82* (2026.01)

(58) Field of Classification Search
USPC .......................................................... 320/132
See application file for complete search history.

(56) References Cited

U.S. PATENT DOCUMENTS

| | | | | |
|---|---|---|---|---|
| 2014/0111163 | A1* | 4/2014 | Yamauchi | H01M 10/441 320/128 |
| 2016/0226268 | A1* | 8/2016 | Okui | H02J 7/56 |
| 2022/0003822 | A1* | 1/2022 | Naito | G01R 31/3842 |
| 2023/0010424 | A1* | 1/2023 | Hasebe | B60L 58/15 |
| 2023/0208177 | A1* | 6/2023 | Freytes | H02J 3/466 320/103 |
| 2026/0045806 | A1* | 2/2026 | Chen | H02J 7/56 |

OTHER PUBLICATIONS

Written Opinion and International Search Report for corresponding international application No. PCT/EP2021/084127, dated Mar. 9, 2022.

* cited by examiner

POWER MANAGING METHOD AND SYSTEM

The present invention is directed to systems and methods for managing power of an energy storage system coupled to a power grid.

The power grid is connected to a plurality of electrical energy sources. Electricity must be generated constantly to meet uncertain demand, which often results in imbalance between supply and demand, leading namely to variations of the frequency. The reliability and safety of the power grid must be guaranteed. For instance, it is necessary to regulate the frequency of the power grid.

Besides, polluting forms of electric power generation can be replaced with clean ones to reduce the environmental impact. However, certain types of energy sources, including renewable power generation sources such as solar, water, wind generation may require special forms of regulation in order to minimize the effect of their intermittent and unpredictable nature on grid stability.

Energy storage systems including a plurality of energy storage devices, such as battery containers, can be used to provide ancillary services that regulate a fluctuation in the generated power. The overall balance can be ensured by frequency regulation.

Based on a signal from a transmission system operator of the power grid, the energy storage systems may respond by either charging or discharging all energy storage devices. During the process, the energy storage devices can occasionally overheat, approach full, approach empty, or encounter some other condition that might damage the energy storage devices.

The energy storage systems generally include power conversion systems configured to convert direct current (DC) power supplied from the energy storage devices into alternating current (AC) power and to supply it to a connection point coupled to the power grid. Usually, for charging the energy storage devices, the electrical power that reaches the connection point is distributed evenly in all energy storage devices and associated power conversion systems, and vice versa when discharging the energy storage devices.

However, during periods of under-supply, for example with a requested electrical power below 30% of the operating rate of the power conversion systems during a whole day, the whole power conversion systems do not operate in their useful operating range, which generally leads to energy loss.

The purpose of the invention is to compensate at least partially for these problems of earlier art. It is therefore an object of the present invention to provide a solution to manage power in order to take into account the instability of the power grid, to prevent damages of the energy storage system. It is also an object to allow both the energy storage devices and power conversion systems to get the highest performance score while maximizing their life-span.

This object is achieved according to the invention by a power managing method of an energy storage system coupled to a power grid, the energy storage system including a predetermined number of energy storage devices and power conversion systems respectively coupled to at least one associated energy storage device, the method comprising:

sequencing the energy storage devices on the basis of their respective state of charge, determining a request to absorb or to provide electrical power, setting at least one electrical power threshold, depending on the electrical power requested and said electrical power threshold set, calculating a number of energy storage devices to be activated, activating the calculated number of energy storage devices and their associated power conversion systems, according to the sequence ranking.

The electrical power threshold set is the electrical power threshold to be absorbed or provided per energy storage device. Such threshold is also called activation electrical power threshold.

The energy storage system is arborescent and this method allows concentrating the solicitations on a limited number of branches. The electrical power threshold is chosen to provide a good performance by minimizing the acceleration of battery aging. The activated branches are in the useful operating ranges of both energy storage devices and power conversion systems. This minimizes the system's performance losses.

Further, with this method possible breakdowns of energy storage devices or those under maintenance are taken into account. The logic of distributing and activating the least amount of energy storage devices adapts for taking into account the non-available devices.

The power managing method may also comprise one or more of the following features, taken separately or in combination.

According to one embodiment, the method may comprise:

activating the calculated number of energy storage devices with the lowest states of charge to be charged, if the request is to absorb electrical power, activating the calculated number of energy storage devices with the highest states of charge to be discharged, if the request is to provide electrical power.

If all energy storage devices and their associated power conversion systems are activated, and if the electrical power requested exceeds said electrical power threshold multiplied by the total number of energy storage devices, then the method may comprise increasing evenly the electrical power to absorb or to provide for each energy storage device.

According to one embodiment, the method may comprise setting a desired state of charge range with a lower limit and an upper limit.

An energy storage device previously activated may be deactivated when its state of charge reaches one of the limits, then the next energy storage device according to the sequence ranking may be activated.

This allows for a rotation of the energy storage devices to be activated and prevents the same ones from always being activated and aging faster compared to the rest of the system.

A mean state of charge of all energy storage devices may be calculated.

For example, the lower limit of the desired state of charge range is set by subtracting a predefined percentage to the mean state of charge. The upper limit is set by adding the predefined percentage to the mean state of charge.

The states of charge of the whole energy storage devices are homogenized, maintained in an average state of charge bracket.

Preferably, the predefined percentage is about 5% of the mean state of charge.

The mean state of charge may be calculated at a predefined time interval. For instance, the predefined time interval is about 10 s.

If the electrical power requested decreases, at least one of the energy storage devices currently activated may be deactivated before reaching one of the limits of the desired state of charge range.

Advantageously, the first energy storage device to be activated according to the sequence ranking is the first to be deactivated.

The energy storage devices may be sequenced by increasing state of charge.

Said at least one electrical power threshold may be set between 40% and 80% of the maximal electrical power of the energy storage devices.

For example, for a maximal electrical power of 2.5 MW, said at least one electrical power threshold is below 2 MW. Said electrical power threshold is in particular between 1 MW and 1.8 MW.

Preferably, the calculated number of energy storage devices to be activated is the entire number greater or equal to the electrical power requested divided by said electrical power threshold.

The invention also relates to a power managing system comprising at least one energy storage system coupled to a power grid, the energy storage system including a predetermined number of energy storage devices and power conversion systems respectively coupled to at least one associated energy storage device, said power managing system being configured for implementing a power managing method previously described.

Other features and advantages of the invention will emerge more clearly on reading the following description, which is given as a non-limiting illustrative example, and the attached drawings, among which:

In these figures, identical elements have the same reference numbers.

The following embodiments are examples. Although the description refers to one or more embodiments, this does not necessarily mean that each reference relates to the same embodiment or that the features apply only to just one embodiment. Single features of different embodiments can also be combined or interchanged to provide other embodiments.

In the description, it is possible to index some elements, such as for example first element or second element. In this case, it is a simple indexing to differentiate and name close but not identical elements. This indexing does not imply a priority of one element with respect to another and such denominations can be interchanged without departing from the scope of the present description. This indexing does not imply any order in time.

Figure 1:
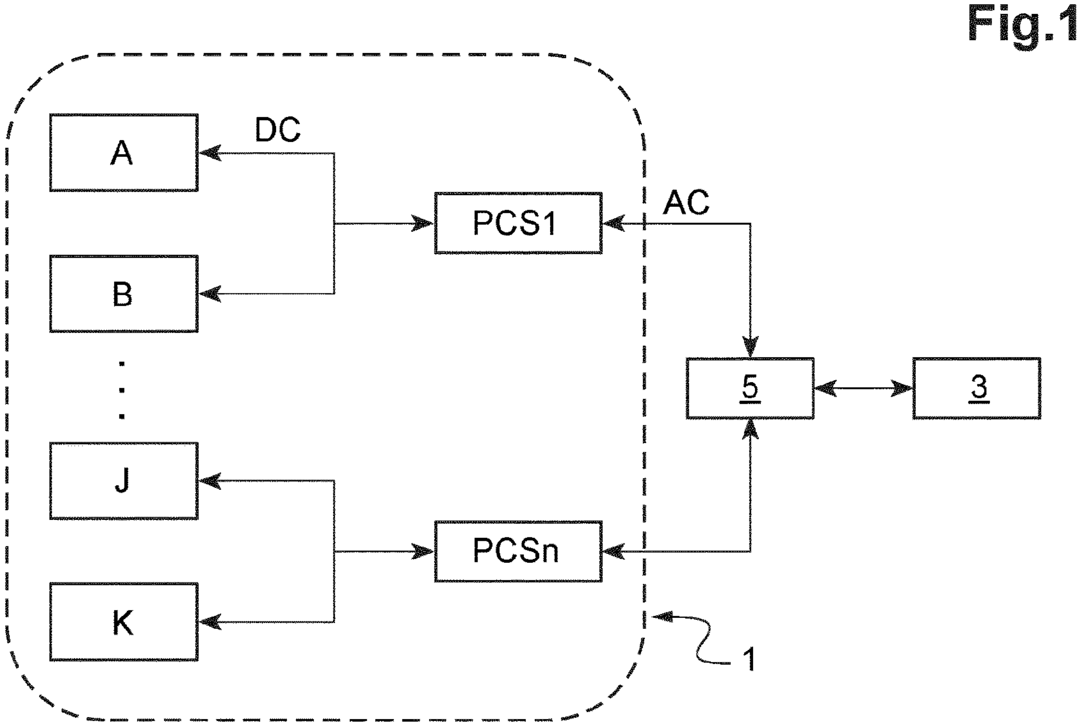
FIG. 1 depicts an embodiment of an energy storage system connected to a power grid and including energy storage devices and associated power conversion systems.

Referring to FIG. 1, the present disclosure is directed to a method and a system for managing power of an energy storage system 1 coupled to a power grid. Within an operating environment, different energy sources may be coupled to the power grid. In particular, natural energy (renewable energy) sources such as solar power, water power, wind power, biomass energy, and geothermal power may be used.

The energy storage system 1 may be connected to an operator of the power grid 3, such as a transmission system operator, through a connection point 5.

The energy storage system 1 generally includes a predetermined number of energy storage devices A, B, . . . , J, K, and power conversion systems PCS1, . . . , PCSn.

The energy storage devices A, B, . . . , J, K, are configured to store power.

An energy storage device includes at least one battery container. According to one embodiment, the energy storage system 1 includes eleven battery containers. The battery containers may have the same configuration. They generally include a plurality of battery cells. The configuration of the battery containers is known and will not be further described.

The power conversion systems PCS1, . . . , PCSn are respectively coupled to at least one associated energy storage device A, B, . . . , J, K. Thus, the energy storage system 1 is arborescent as shown in FIG. 1.

The power conditioning systems PCS1, . . . , PCSn are configured to convert the direct current DC power supplied from one or more associated energy storage devices A, B, . . . , J, K, into alternating current AC power with a raised voltage, compared to the output voltage of said devices, and conversely.

The number of energy storage devices A, B, . . . , J, K, such as battery containers, associated to one power conditioning system PCS1, . . . , PCSn depends in particular on the technology of the power conditioning system PCS and on the power of the battery containers. One energy storage devices A, B, . . . , J, K may be associated to one power conditioning system PCS1, . . . , PCSn. According to another non-binding embodiment illustrated on FIG. 1, two energy storage devices may be associated to one single power conditioning system PCS1, . . . , PCSn.

The power managing system may comprise at least one energy storage system 1 coupled to a power grid, and is configured for implementing the power managing method hereafter described. In other words, it comprises one or more processing means for implementing the method.

The energy storage system 1 can be operated to offer a global balance of the power grid by charging or discharging the energy storage devices A, B, . . . , J, K.

Operations to charge or discharge the energy storage devices A, B, . . . , J, K, can be based upon a plurality of regulation parameters, rules, and inputs, depending on the market, including, but not limited to rules set by the operator of the power grid 3 such as a transmission system operator. The rules may be established according to the market needs.

The power managing method comprises a step of determining a request to absorb or to provide electrical power. This request may come from the power grid operator 3 but not necessarily. Alternately, an energy management system can define the power to absorb or provide, generally based on rules set by the operator of the power grid 3 and/or based on an energy regulations framework defined by countries committees, and then sends the request.

The managing power method comprises a step for sequencing the energy storage devices A, B, . . . , J, K, on the basis of their respective state of charge.

More precisely, the energy storage devices A to K are sequenced by increasing state of charge. This defines a priority ranking of the devices to be called or activated, for operating a charge or discharge.

If the request is to absorb electrical power, the priority ranking allows to call or activate, one or more energy storage devices with the lowest states of charge to be charged.

Conversely, if the request is to provide electrical power, the priority ranking allows to call or activate, one or more energy storage devices with the highest states of charge to be discharged.

Regarding the example with eleven energy storage devices such as battery containers (FIG. 2), according to the sequence A, B, C, D, E, F, G, H, I, J, K, the energy storage device A is the least charged and the first that will be activated to be charged if the request is to absorb electrical power. On the contrary, the energy storage device K is the most charged and the first that will be activated to be discharged if the request is to provide electrical power.

The managing power method comprises a step for setting at least one electrical power threshold. This threshold is the electrical power threshold to be absorbed or provided per energy storage device. Such threshold is hereafter also named activation threshold.

This is a threshold to determine when to call a new device or when to deactivate a previously activated device, depending on the power requested. In other words, once set, the activation threshold is used for determining the number of energy storage devices to activate. If the request is to absorb electrical power, it is used for determining how many of the least charged energy storage devices to be charged. If the request is to provide electrical power, it is used for determining how many of the most charged energy storage devices to be discharged.

The activation threshold is chosen as a compromise between the power conversion systems PCS1, . . . , PCSn efficiency, the battery containers solicitation, and the power consumption. The activation threshold is defined to optimize the battery life and auxiliary consumption.

Especially, the activation threshold may be set between 40% and 70% or 80% of the maximal electrical power of the energy storage devices. For instance, for a maximal power of 2.5 MW, the activation threshold is chosen below 2 MW, in particular between 1 MW and 1.8 MW.

The managing power method further comprises a step for calculating the number of energy storage devices to be activated.

This number depends on the electrical power requested and the activation threshold set. It is the entire number greater or equal to the electrical power requested divided by the activation electrical power threshold.

Then, the calculated number of energy storage devices and their associated power conversion systems PCS1, . . . , PCSn, according to the sequence ranking are activated. Namely if the request is to absorb electrical power, the calculated number of energy storage devices with the lowest states of charge are activated to be charged. Those with the highest states of charge are activated to be discharged, if the request is to provide electrical power.

This allows activating the energy storage devices one after the other. As long as the requested power is below the activation electrical power threshold, one energy storage device is called, activated. When the requested power is above the threshold, a second energy storage device is called, and so on.

Figure 2:
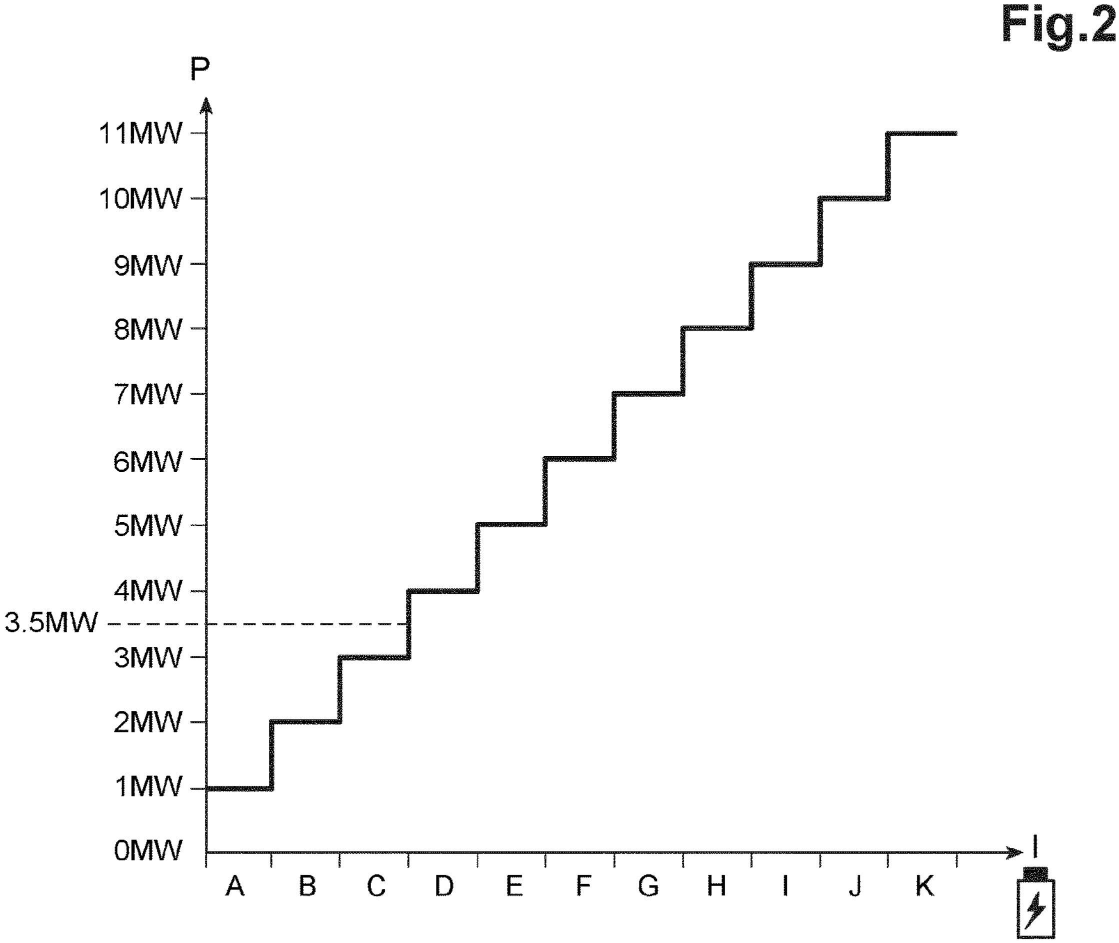
FIG. 2 is a graph showing the number of energy storage devices to be activated as a function of a requested power.

Referring to the example in FIG. 2, the energy storage devices have a maximal electrical power of 2.5 MW and the predefined activation threshold is 1 MW. For instance, if the request is to absorb 1 MW or below only one battery container will be activated. According to the sequence previously stated, the least charged energy storage device A is called to be charged. The other devices B-K will remain in a standby mode.

If the request is to absorb for example 3.5 MW, four battery containers will be activated. The four least charged devices A, B, C and D are called to be charged. The other seven devices E-K will remain in a standby mode.

On the contrary, if the request is to provide for example 2 MW, two battery containers will be activated to be discharged, those with the highest states of charge.

If all energy storage devices A-K and their associated power conversion systems PCS1, . . . , PCSn are activated, in case the electrical power requested exceeds said activation threshold multiplied by the total number of energy storage devices, for instance 11 MW, then, the electrical power to absorb or to provide is evenly increased for each energy storage device.

In order to avoid always calling the same energy storage devices, the activation logic comprises rotation rules of the energy storage devices A-K such as battery containers, so that the priority order of the sequence varies.

According to a preferred embodiment, the rotation rules are based on the states of charge of the energy storage devices A-K. Thus, the priority order varies with the states of charge.

For this purpose, a desired state of charge range is set. The desired state of charge range has a lower limit and an upper limit.

The lower and upper limits are configurable. Preferably, they are set as a percentage to add or subtract to a mean state of charge of all energy storage devices.

Therefore, the method comprises one or more steps of calculating the mean state of charge of all energy storage devices.

Of course, when charging or discharging one or more energy storage devices, the mean state of charge varies. It may be calculated at a predefined time interval, for instance each 10 s.

The lower limit may be set by subtracting a predefined percentage to the mean state of charge. The upper limit may be set by adding the predefined percentage to the mean state of charge.

The predefined percentage is chosen as a compromise between the activation frequency of the energy storage devices and the homogenization of the states of charge. If the percentage is too low, the activation frequency might be too quick, hardly a module is called that it is necessary to call another one. But if the percentage is too high, the states of charge are not homogenous.

For instance, the predefined percentage is about 5% of the mean state of charge. In this example, 5% avoids spending time turning on and off too often the energy storage devices and at the same time avoids having too many deviations of the states of charge of all devices.

Besides, the logic is done by power conversion system PCS1, . . . , PCSn. In particular, referring back to the example in FIG. 1, the same state of charge is kept for a set of energy storage devices connected to a same power conversion system PCS1, . . . , PCSn, for instance the devices A and B, or J and K. There can be a slight difference of the states of charge between the set of energy storage devices, for instance A, B, connected to a first power conversion system PCS1 and the set of energy storage devices, for instance J, K, connected to a second power conversion system PCSn.

When the state of charge of a first energy storage device previously activated called, reaches one of the limits, it is deactivated and then a second device is called, and so on. The next energy storage device to be activated is chosen according to the sequence ranking. Generally, the next energy storage device to be called is the one furthest from the mean state of charge.

For instance, if a first device, the least charged, is called to be charged, when it reaches the upper limit, a second device which is now the least charged, is called to be charged. Conversely, if a first device, the most charged, is called to be discharged, when it reaches the lower limit, a second device which is now the most charged, is called to be discharged.

This allows keeping the states of charge of all energy storage devices homogenized, maintained in an average state of charge bracket a homogenous state of charge. Indeed, an energy storage device, when activated, absorbs or releases energy until its state of charge reaches the limit, but it does not diverge from the rest of devices of the energy storage system 1 in a stand-by mode.

If the electrical power requested decreases, at least one of the energy storage devices currently activated is deactivated before reaching one of the limits of the desired state of charge range. The first energy storage device to be activated according to the sequence ranking is the first to be deactivated. The second energy storage device to be activated will be the second deactivated and so on.

Figure 3:
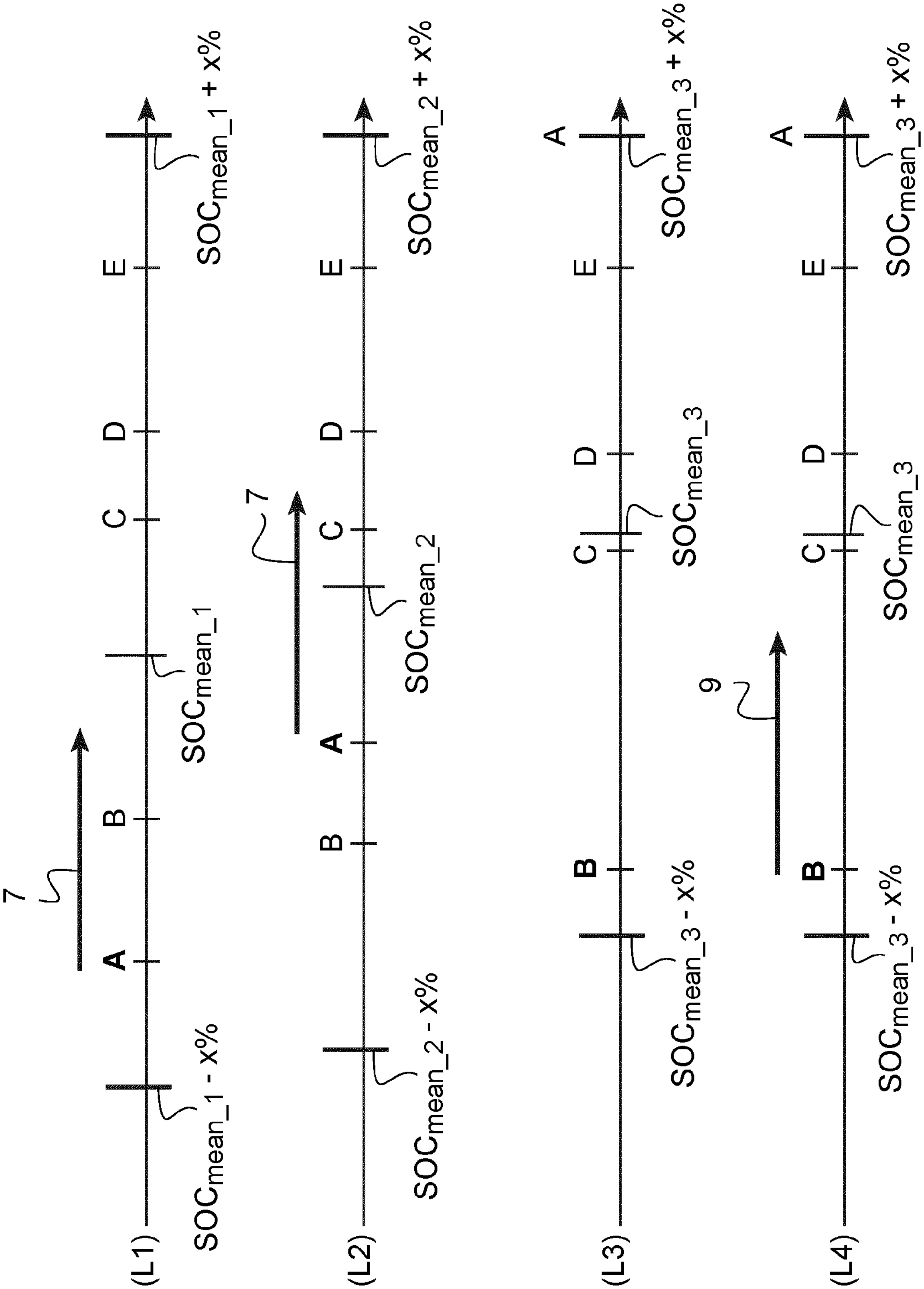
FIG. 3 shows the evolution between two limits of the state of charge of an energy storage device when charged and the change of priority of the sequence ranking.

Referring to the example in FIG. 3, five energy storage devices A, B, C, D, E, each being associated to a power conversion system (not shown). First, they are sequenced in this order, A to E, as shown in the line L1 with A being the least charged and E being the most charged. The mean state of charge $SOC_{mean\_1}$, the lower limit $SOC_{mean\_1}$−x % and the upper limit $SOC_{mean\_1}$+x % are calculated.

Regarding the power requested and the activation threshold, the number of energy storage devices to be activated is one for example.

For instance, if the request is to absorb power, the least charged energy storage device A is called to be charged, as shown by the arrow 7. The other devices B-E remain in a standby mode.

When it charges, the energy storage device A absorbs energy, such that it state of charge varies, as shown in the line L2. As a consequence, the mean state of charge varies. As stated before, the mean state of charge can be calculated again for instance after 10 s, and is referred to as $SOC_{mean\_2}$. The limits $SOC_{mean\_2}$−X %; $SOC_{mean\_2}$+X % are also calculated again. This is a schematic and simplified representation. The state of charge varies marginally when there is only one activated energy storage device as there are several energy storage devices. The mean state of charge varies more when several energy storage devices are activated simultaneously.

As represented in the line L3, the energy storage device A continues to absorb energy and its state of charge varies. The mean state of charge can be calculated again and is referred to as $SOC_{mean\_3}$. The limits $SOC_{mean\_3}$−x %; $SOC_{mean\_3}$+X % are also calculated again. When the state of charge of the energy storage device A reaches a deactivation limit, here the upper limit $SOC_{mean\_3}$+x %, it is deactivated.

The new priority order of the energy storage devices to be charged is B, C, D, E, A. The least charged energy storage device is now the energy storage device B and is the next to be activated to be charged as shown by the arrow 9. The other devices C-E and A remain in a standby mode. When it charges, the energy storage device B absorbs energy, until it eventually reaches a deactivation limit.

Figure 4:
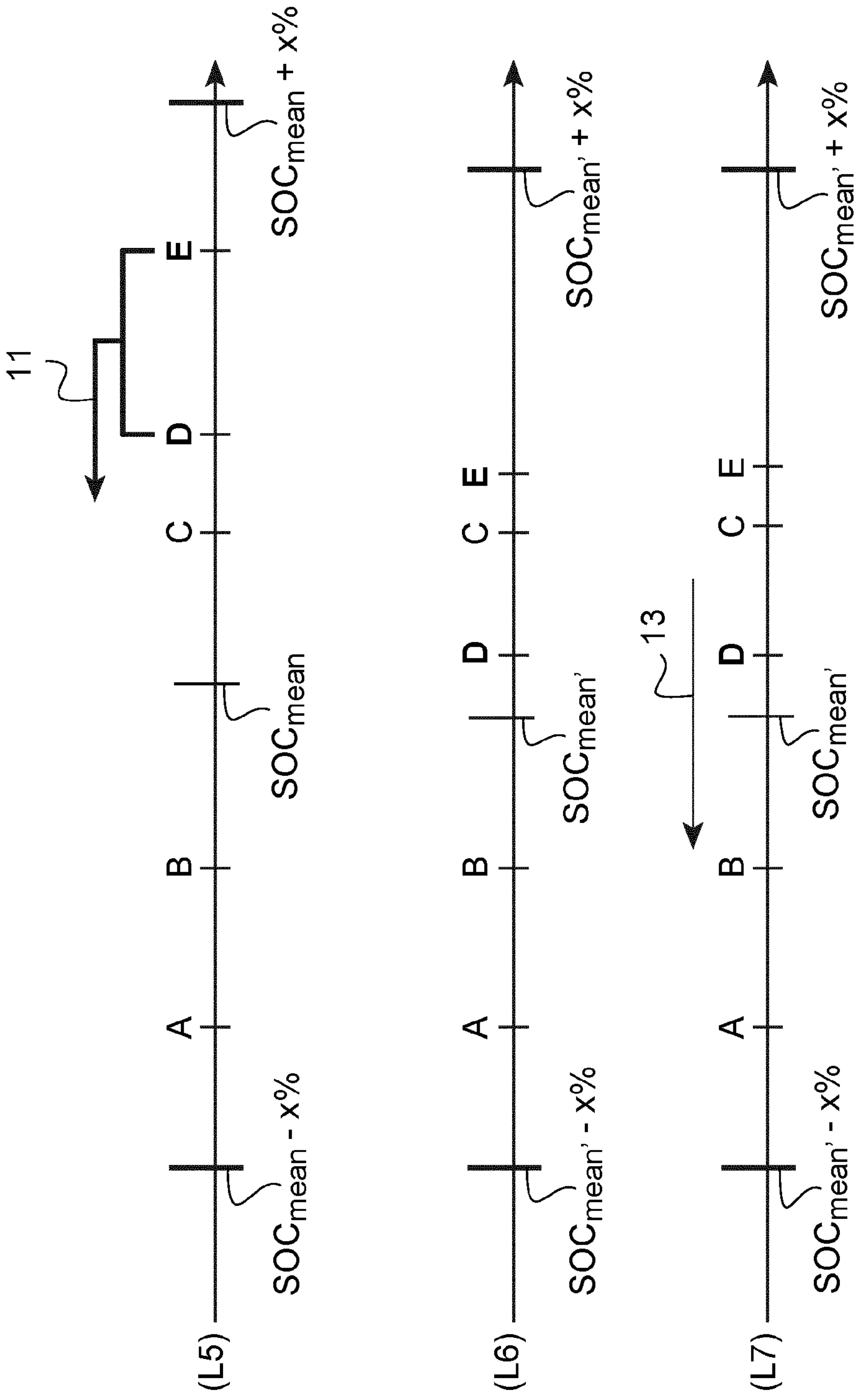
FIG. 4 shows the evolution between two limits of the states of charge of energy storage devices when discharged and the change of priority of the sequence ranking.

Conversely, referring to the example in FIG. 4, the energy storage devices are sequenced from A to E, as shown in the line L5 with A being the least charged and E being the most charged. The mean state of charge $SOC_{mean}$, the lower limit $SOC_{mean}$−x % and the upper limit $SOC_{mean}$+x % are calculated. Regarding the power requested and the activation threshold, the number of energy storage devices to be activated is two for example.

If the request is to provide power, the most charged energy storages devices D, E are called to be discharged, as shown by the arrow 11. Both energy storage devices D, E are activated at the same time, but regarding the algorithm the energy storage device E which is the most charged is the first to be called and then the energy storage device D is called. The other energy storage devices A-C remain in a standby mode.

When discharging, the energy storage devices D and E release energy, such that their states of charge varies, as shown in the line L6. As a consequence, the mean state of charge may vary. As stated before, the mean state of charge can be calculated again after 10 s and is referred to as $SOC_{mean'}$. The limits $SOC_{mean'}$−x %; $SOC_{mean'}$+x % are also calculated again.

In case the requested power drops while both energy storage devices D, E are activated, such that only one needs to remain activated, one of them is deactivated. The first one that was activated is the first to be deactivated. In this example, the device E was the first to be activated and is the first to be deactivated as shown in line L7. The energy storage device D remains the only one called. The energy storage device D continues to release energy as shown by the arrow 13 and its state of charge varies.

According to non-binding example in FIG. 4 line L7, the new priority order of the energy storage devices to be discharged is E, C, B, A (D being already activated).

The mean state of charge can be calculated again. The limits are also calculated again. When the state of charge of the energy storage device D reaches a deactivation limit, here the lower limit, it is deactivated.

It power is still requested, the next most charged energy storage device can be activated to be discharged, until it eventually reaches a deactivation limit.

Furthermore, if part of the energy storage devices of the energy storage system 1 is down or under maintenance, the activation logic adapts. For instance, if one energy storage device is down, it is taken into account and the electrical power is distributed over the remaining devices. In other words, if the energy storage system 1 includes N energy storage devices and one is down, the electrical power is distributed over N−1 energy storage devices.

It is understood that embodiments of the present invention can be carried out in form of hardware and/or software. Any such software can be stored in the form of a volatile or non-volatile storage, for example storage like a ROM, whether erasable or rewritable or not, or in the form of memory such as, for example RAM, memory chips, device or integrated circuits or an optically or magnetically readable medium. It is understood that the storage devices and storage media are embodiments of machine-readable storage that are suitable for storing program or programs that, when executed, implement embodiments of the present invention. Accordingly, embodiments provide a program comprising code for implementing a system or method as described and a machine readable storage storing such a program. Further, embodiments of the present invention may be conveyed electronically via any medium such as a communication signal carried over a wired or wireless connection and embodiments suitably encompass the same.

Thus, the method and system allow the management of power distribution within the various power conversion branches of the energy storage system 1.

The solicitations are concentrated on a limited number of branches, each branch comprising one power conversion system PCS1, . . . , PCSn and one associated energy storage device or a set of energy storage devices A, B, . . . , J, K. The activated branches operate in their useful operating ranges and the other branches are off. The overall efficiency of the branches of battery containers and power conversion systems PCS1, . . . , PCSn is optimized.

It is avoided that a container is called more often than the others and aging very quickly compared to the others.

Finally, the states of charge of the energy storage devices A-K remain as uniform, homogeneous as possible.

The invention claimed is:

1. A power managing method of an energy storage system coupled to a power grid, the energy storage system including a predetermined number of energy storage devices (A-K) and power conversion systems (PCS1, PCSn) respectively coupled to at least one associated energy storage device, thereby defining branches of the energy storage system, each branch comprising one of the power conversion systems and at least one associated energy storage device, the method comprising:

- sequencing the energy storage devices (A-K) on a basis of their respective state of charge, wherein the sequencing defines a priority ranking that varies with the states of charge,
- determining a request to absorb or to provide electrical power, wherein the request is received from a power grid operator or generated by an energy management system based on rules set by the power grid operator and/or an energy regulations framework,
- setting at least one activation electrical power threshold for determining a number of the least charged energy storage devices to be charged, if the request is to absorb electrical power, or a number of the most charged energy storage devices to be discharged, if the request is to provide electrical power,
- depending on the electrical power requested and said activation electrical power threshold set, determining the number of energy storage devices to be charged or discharged, respectively,
- activating the power conversion systems (PCS1, PCSn) associated with a set of energy storage devices corresponding to the determined number, according to the priority ranking, so that activated power conversion systems and the set of energy storage devices operate in useful operating ranges,
- calculating a mean state of charge (SOCmean) of all energy storage devices,
- setting a state of charge operating range with a lower limit ($SOC_{me}$an−x %) and an upper limit ($SOC_{me}$an+x %), wherein the lower limit (SOCmean−x %) of the state of charge operating range is set by subtracting a predefined percentage (x) from the mean state of charge (SOCmean) and the upper limit (SOCmean+x %) is set by adding the predefined percentage (x) to the mean state of charge ($SOC_{me}$an), and
- deactivating a power conversion system previously activated, when the state of charge of its at least one associated energy storage device reaches one of the limits ($SOC_{me}$an+x %, SOCmean−x %), then activating a new power conversion system associated with the next energy storage device (B; D) in the sequence defining the priority ranking.

2. The method according to claim 1, comprising:

- activating the determined number of energy storage devices with the lowest states of charge (A) to be charged, if the request is to absorb electrical power, and
- activating the determined number of energy storage devices with the highest states of charge (E, D) to be discharged, if the request is to provide electrical power.

3. The method according to claim 1, wherein:

- when all energy storage devices and their associated power conversion systems are activated, and
- the electrical power requested exceeds said activation electrical power threshold multiplied by a total number of energy storage devices,
- then, increasing equally for each activated energy storage device the electrical power to absorb or to provide.

4. The method according to claim 1, wherein the predefined percentage is 5% of the mean state of charge (SOCmean).

5. The method according to claim 1, wherein the mean state of charge (SOCmean) is calculated at a predefined time interval.

6. The method according to claim 5, wherein the predefined time interval is 10 seconds.

7. The method according to claim 1, wherein if the electrical power requested decreases, at least one of the energy storage devices currently activated is deactivated before reaching one of the limits ($SOC_{me}$an+x %, SOCmean−x %) of the desired state of charge operating range.

8. The method according to claim 7, wherein a first energy storage device to be activated (A; E) according to the priority ranking is the first to be deactivated.

9. The method according to claim 1, wherein the energy storage devices are sequenced by increasing state of charge (A-K).

10. The method according to claim 1, wherein said at least one activation electrical power threshold is set between 40% and 80% of a maximal electrical power of the energy storage devices.

11. The method according to claim 10, wherein said at least one activation electrical power threshold is below 2MW for a maximal electrical power of 2.5 MW.

12. The method according to claim 1, wherein the determined number of energy storage devices to be activated is a smallest integer greater than or equal to the electrical power requested divided by said activation electrical power threshold.

13. A power managing system comprising at least one energy storage system coupled to a power grid, the energy storage system including a predetermined number of energy storage devices (A-K) and power conversion systems (PCS1, PCSn) respectively coupled to at least one associated energy storage device (A-K), said power managing system being configured for implementing the power managing method according to claim 1.

* * * * *